1

3,004,062
PURIFICATION OF PHTHALIC ACID ESTERS
Robert W. F. Kreps, Amsterdam, Netherlands, assignor to Shell Oil Company, a corporation of Delaware
No Drawing. Filed July 7, 1958, Ser. No. 746,668
Claims priority, application Netherlands July 30, 1957
7 Claims. (Cl. 260—475)

This invention relates to the purification of phthalic acid esters and relates more particularly to the purification of the di-alkyl esters of terephthalic and isophthalic acid.

Alkyl esters of phthalic acids, such as, for example, the lower alkyl esters of tere- and isophthalic acids, are employed in important fields of application. Dimethylterephthalate is used on a large scale for the preparation of macromolecular compounds, in particular synthetic fibers, such as terylene. Such application of these esters, however, makes exceptionally high demands on their purity, because during processing the presence of exceedingly small amounts of impurities will generally result in discoloration. This is particularly disadvantageous in the manufacture of such materials as, for example, textiles, therefrom. Adequate purity can generally not be obtained by such methods as distillation and the like. Impurities often present in these esters, particularly when derived from acids made by air oxidation of alkyl benzenes, generally comprise materials of ketonic structure having a boiling temperature close to that of the ester containing them. Consequently purification of the esters of terephthalic and isophthalic acids has heretofore often necessitated recourse to complex, time-consuming and costly operations, detracting materially from efficient utilization of these materials on a practical scale. Attempts made heretofore to effect improvement in the purity of the esters by chemical treatments have often proven either inadequate or too costly. Methods proposed heretofore directed to chemical treatment of the resins often involved the use of temperatures sufficiently high to result in substantial loss of valuable material. The times of contact which had to be employed in such treatments were often of such long duration as to render the process impractical.

It is therefore an object of the present invention to provide a process enabling the more efficient purification of esters of phthalic acids wherein the above difficulties are obviated to at least a substantial degree.

Another object of the invention is the provision of an improved process enabling the more efficient purification of the lower alkyl esters of terephthalic and isophthalic acids.

A more particular object of the invention is the provision of an improved process enabling the more efficient purification of dimethylterephthalate obtained by the esterifying of terephthalic and isophthalic acids made by oxidizing alkyl-substituted benzenes with molecular oxygen.

A still more particular object of the invention is the purification of dimethylterephthalate containing contaminating amounts of ketonic impurities comprising the methyl ester of para-acetylbenzoic acid. Other objects and advantages of the invention will become apparent from the following detailed description thereof.

It has now been found that esters of phthalic acid are purified with substantially improved efficiency by heating the esters in the presence of added molecular oxygen and in the presence of a salt of copper and/or manganese with an aliphatic carboxylic acid, at temperatures not substantially in excess of about 220° C.

The esters purified in accordance with the invention comprise the esters of the phthalic acids, particularly the lower alkyl esters of terephthalic acid and of isophthalic acid. Such lower alkyl esters comprise, for example, the methyl, ethyl, propyl, amyl, hexyl, octyl, etc. esters of tere- and isophthalic acids. The invention is applied with advantage to the full esters of these acids. A particular advantage of the invention resides in the efficiency with which it purifies the lower alkyl esters of tere- and isophthalic acids, for example, dimethylterephthalate, obtained by esterifying acids made by the oxidation with molecular oxygen of alkyl-substituted benzenes such as di-isopropylbenzenes, xylenes, etc.

The esters to be purified may be subjected to initial distillation, or other suitable treatment to effect the removal of undesired components therefrom. Such treatments will generally not result in a product of acceptable purity as determined by ability to withstand heating at 200° C. for at least four hours without undergoing substantial discoloration.

The process of the invention enables the purification to proceed at relatively mild conditions, and with relatively short contact times, thereby avoiding the loss of valuable charge materials generally encountered at higher temperatures, particularly at the exceedingly long contact times often encountered in processes disclosed heretofore directed to the purification of the esters. The process of the invention enables the obtaining of esters which maintain their white appearance even after heating for four hours or more at 200° C. with a minimum of operative procedure.

In accordance with the invention the esters to be purified are contacted with a salt of copper and/or manganese with an organic acid, in the presence of molecular oxygen, in the liquid phase.

The presence of the liquid phase is assured by maintaining the ester at its melting temperature or a somewhat higher temperature, during treatment. The minimum temperature to be employed will, of course, vary with the nature of the specific ester being treated. For the purification of impure dimethylterephthalate a temperature in the range of from about 140° C. to about 220° C. has been found satisfactory.

The maintaining of a liquid phase during the treatment may be facilitated at times by the use of a suitable solvent for the ester. Suitable solvents comprise any of the materials which are liquid under the conditions employed, in which the ester possesses at least substantial solubility, and which do not undergo substantial reaction under the condition employed.

The substantially improved efficiency with which the purification of the esters proceeds in accordance with the invention, is attributable, at least in part, to the use of the copper and/or manganese in the form of a compound consisting essentially of the salt of the metal with an organic acid. Suitable compounds of copper and/or manganese comprise, for example, the salts of these metals with an aliphatic carboxylic acid such as the salt of copper and/or manganese with acetic, propionic, butyric, pentanoic acid, etc. Other examples of suitable salts comprise the salicylates, octoates, toluates, and the like, of these metals. The use of salts of copper and/or manganese with a lower aliphatic carboxylic acid, such as, for example, the acetates, is particularly preferred. The presence of metals in metallic form in the esters is to be expressly avoided.

The copper and/or manganese salt of the organic acids are used in relatively small amounts. In general the use of the salts in an amount ranging from about 0.1 to about 0.5% of the salt based upon the ester undergoing treatment has been found satisfactory. Somewhat higher or lower amounts may, however, be used within the scope of the invention. Particularly preferred salts are those which are soluble in the esters undergoing purification, or in the solution of these esters in a suitable solvent. The salt may be added to the esters in the form of a solution in a solvent which is inert under the conditions of operation and which does not adversely affect the purification treatment.

Heating of the ester in the presence of the copper and/or manganese salt is carried out in the presence of added oxygen. In a preferred method of executing the invention oxygen, or an oxygen containing gas such as, for example, air, is bubbled through the liquid mixture comprising the ester and salt during the treatment.

An advantage of the invention resides in the substantially reduced time of contact necessitated to obtain a high degree of purification. The duration of the treatment will vary in accordance with the nature of the specific ester being purified, the particular operating conditions used, the initial purity of the ester and the degree of purity desired in the purified product. Often the subjection of the ester to the treatment for a period of, for example, from about one to about thirty minutes will suffice to obtain a product of satisfactory purity. Longer contact times may however be employed within the scope of the invention. Durations of from about two to about three hours need rarely be exceeded to obtain a high degree of purification.

The improvement effected under the conditions of the invention is believed to be attributable in part to the presence, frequently noticed by applicants, of certain ketonic impurities in the alkyl esters of phthalic acid. Thus, in impure methyl esters of terephthalic acid, traces of ketonic compounds such as, for example, para-acetylbenzoic acid methyl ester have been observed. These ketonic impurities generally turn brown in color upon being subjected to elevated temperatures. Under the conditions of the invention the para-acetylbenzoic acid methyl ester is oxidized to monomethylterephthalate. Whereas the para-acetylbenzoic acid methyl ester cannot be separated from the dimethylterephthalate by such procedures as distillation, it is quite possible to effect the separation between the mono- and the di-ester of terephthalic acid after the oxidation by such means. Traces of other impurities are, however, also generally present and the ester containing them is purified in accordance with the invention. It is to be stressed that the invention is in no wise limited by theories advanced herein to set forth more fully the nature of the invention.

As a result of the purification treatment the ester will be free of components having any substantial adverse effect upon its color stability even during prolonged periods at elevated temperatures. After the purification treatment the ester may be subjected to conventional process steps to effect the removal of components therefrom formed during the treatment. Such process steps comprise, for example, distillation, solvent extraction, contact with adsorptive materials or ion-exchange resins, and the like. Although such after-treatment is generally not essential, copper and manganese compounds are preferably removed after the purification treatment. Suitable means for effecting such removal of these compounds comprise one or more such steps as, for example, washing with water or other suitable liquid in which the metal compounds are soluble while maintaining the ester in solution in a solvent which is immiscible with the washing with the washing liquid; crystallization; distillation; fractionation; etc.

The following examples are illustrative of the invention:

Example I

The starting material consists of a batch of dimethylterephthalate obtained by esterifying terephthalic acid made by the oxidation of para-di-isopropylbenzene with air in the presence of a cobalt-manganese catalyst in acetic acid medium, identified herein as "Ester A." "Ester A" had been distilled, was white in color, and contained 750 parts per million of para-acetylbenzoic aicd methyl ester.

A sample of "Ester A" is heated in a sealed tube up to 200° C. During the heating the "Ester A" became yellow in color.

A separate sample (100 grams) of "Ester A" is purified by heating in a molten state for a period of one hour in the presence of 0.5% by weight, based on the ester, of manganese acetate. Oxygen is passed through the molten ester during the heating at the rate of 3 liters per hour. After the heating the ester is distilled under vacuum. The para-acetylbenzoic acid methyl ester content of the treated "Ester A" is found to be only 25 parts per million. A sample of the purified ester is heated at 200° C. in a sealed tube for a period of five hours. At the end of the heating the purified ester is still white in color.

Example II

As starting materials there is employed a batch of dimethylterephthalate, obtained by esterifying terephthalic acid made by oxidizing di-isopropylbenzene with air in the presence of a manganese catalyst, identified herein by the designation "Ester B." "Ester B" contains ketonic impurities comprising methyl ester of para-acetylbenzoic acid in the amount of about 0.07% by weight based on the ester.

A sample of the "Ester B" is heated for five hours at 200° C. in a closed tube whereupon the ester turns dark yellow in color.

A separate sample of "Ester B" is purified by heating for a period of about one hour in the molten state, at 200° C., in the presence of 0.5% copper acetate, while blowing air through the mixture. The purified ester is distilled under vacuum. A sample of the purified ester is heated in a sealed tube at 200° C. for a period of five hours. No discoloration of the sample is observed.

The purification operation is repeated with a separate sample of "Ester B" under substantially identical conditions but with the exception that manganese acetate is used instead of copper acetate. Upon heating a sample of the thus purified ester in a sealed tube for a period of five hours at 200° C. no discoloration of the sample is observed.

Example III

As starting material there is used a batch of dimethyl ester of isophthalic acid, obtained by esterifying isophthalic acid made by the catalytic oxidation with air of xylene, identified here by the designation "Ester C." "Ester C" had been subjected to distillation under vacuum.

A 100-gram sample of "Ester C" is heated in a closed tube for a period of five hours at 200° C. Discoloration of the resin with appearance of a yellow color takes place during the heating.

A separate portion of "Ester C" is subjected to purification by heating for a period of one hour at 200° C. in the presence of copper acetate while blowing air through the molten mixture. After the heating period the purified ester was distilled under vacuum. A 100-gram sample of thus purified "Ester C" is heated in a closed tube at 200° C. for a period of five hours. No substantial discoloration of the purified ester during the heating is apparent.

The invention claimed is:

1. The process for removing components having any substantial adverse effect upon the color stability of a lower alkyl ester of a phthalic acid which comprises heating said ester at a temperature above its melting temperature in the presence of molecular oxygen and a salt of the group consisting of copper lower alkanoate and manganese lower alkanoate and thereafter distilling said esters.

2. The method in accordance with claim 1 wherein said ester is a lower alkyl ester of terephthalic acid.

3. The process in accordance with claim 1 wherein said ester is a lower alkyl ester of isophthalic acid.

4. The method of removing components having any substantial adverse effect upon the color stability of a lower alkyl ester of trephthalic acid which comprises heating said ester in the liquid phase at 140° to 220° C. in the presence of molecular oxygen and a salt of the group consisting of copper lower alkanoate and manganese lower alkanoate and thereafter distilling said esters.

5. The method of removing components having any substantial adverse effect upon the color stability of dimethylterephthalate which comprises heating said dimethylterephthalate at a temperature of from about 140° to about 220° C., in the presence of molecular oxygen, and from about 0.1 to about 0.5% by weight of said dimethylterephthalate of a salt of the group consisting of copper lower alkanoate and manganese lower alkanoate and thereafter distilling said dimethylterephthalate.

6. The process in accordance with claim 5 wherein said salt is copper acetate.

7. The process in accordance with claim 5 wherein said salt is manganese acetate.

References Cited in the file of this patent

UNITED STATES PATENTS

| | | |
|---|---|---|
| 2,005,183 | Flemming et al. | June 18, 1935 |
| 2,653,165 | Levine | Sept. 22, 1953 |
| 2,698,865 | Katzschmann | Jan. 4, 1955 |
| 2,740,811 | Lotz | Apr. 3, 1956 |
| 2,784,221 | Bordenca | Mar. 5, 1957 |